(12) United States Patent
Wagner

(10) Patent No.: US 9,261,397 B2
(45) Date of Patent: Feb. 16, 2016

(54) IN-MOTION SCALE, IN PARTICULAR, CONVEYOR SCALE WITH A CONVEYOR BELT

(75) Inventor: Udo Wagner, Neuhemsbach (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 837 days.

(21) Appl. No.: 12/598,718

(22) PCT Filed: May 5, 2008

(86) PCT No.: PCT/DE2008/000746
§ 371 (c)(1),
(2), (4) Date: Jul. 20, 2010

(87) PCT Pub. No.: WO2008/135027
PCT Pub. Date: Nov. 13, 2008

(65) Prior Publication Data
US 2010/0320008 A1 Dec. 23, 2010

(30) Foreign Application Priority Data
May 4, 2007 (DE) .......................... 10 2007 021 393

(51) Int. Cl.
*B65G 45/10* (2006.01)
*G07G 1/12* (2006.01)
(Continued)

(52) U.S. Cl.
CPC .............. *G01G 11/003* (2013.01); *B65G 45/10* (2013.01); *G01G 19/4144* (2013.01); *A47F 9/047* (2013.01); *B65G 2207/26* (2013.01); *G07G 1/0054* (2013.01); *G07G 1/0072* (2013.01)

(58) Field of Classification Search
CPC .......... B65G 45/10; B65G 45/24; A47F 9/02; A47F 9/046; A47F 9/047; A47F 9/048; G07F 1/0054; G07F 1/0072; G01G 19/03; G01G 19/035; G01G 19/4144; G07G 1/0054; G07G 1/0072
USPC ........................... 177/25.15, 25.18, 119–122; 198/494–499
See application file for complete search history.

(56) References Cited

U.S. PATENT DOCUMENTS 4,401,189 A * 8/1983 Majewski ........................ 186/68
4,529,050 A * 7/1985 Mosher et al. ..................... 177/1
(Continued)

FOREIGN PATENT DOCUMENTS

DE   10 2004 052432 A1   5/2006
EP          0588412 A1   3/1994
(Continued)

OTHER PUBLICATIONS

JPO, Notification of Reasons for Refusal issued Sep. 29, 2011 in corresponding Japanese Patent Application No. 2010-506797 (8 pages).
(Continued)

*Primary Examiner* — Randy W Gibson
(74) *Attorney, Agent, or Firm* — The Culbertson Group, P.C.

(57) ABSTRACT

The invention relates to an in-motion scale, in particular, to a conveyor scale with a conveyor belt, with a load cell (9) and a conveying device (5) for goods to be weighed, in particular, packaged goods, for feeding the goods to and leading them away and from the load cell (9), and with a control device (11) for controlling the functions of the in-motion scale. According to the invention, the control device (11) can be changed over to a cleaning mode in which the functions of the in-motion scale (1) are controlled according to a specified cleaning-mode functional model so that danger to operating personnel and/or damage to the in-motion scale (1) is reduced or eliminated.

16 Claims, 1 Drawing Sheet

(51) Int. Cl.
  *G01G 11/04* (2006.01)
  *G01G 19/415* (2006.01)
  *G01G 11/00* (2006.01)
  *G01G 19/414* (2006.01)
  *A47F 9/04* (2006.01)
  *G07G 1/00* (2006.01)

(56) References Cited

U.S. PATENT DOCUMENTS

| | | | | |
|---|---|---|---|---|
| 4,676,343 | A | * | 6/1987 | Humble et al. ............... 186/61 |
| 4,709,770 | A | * | 12/1987 | Kohashi et al. ............... 177/50 |
| 4,971,176 | A | * | 11/1990 | Nojiri et al. ............... 186/61 |
| 4,977,968 | A | | 12/1990 | Kraemer |
| 5,621,194 | A | * | 4/1997 | Koyama et al. ............ 177/25.18 |
| 5,893,450 | A | * | 4/1999 | Metivier ............... 198/496 |
| 6,135,268 | A | | 10/2000 | Couch et al. |
| 6,803,529 | B2 | * | 10/2004 | Takahashi ............... 177/119 |
| 6,971,503 | B2 | * | 12/2005 | Thompson ............... 198/494 |
| 8,205,741 | B2 | * | 6/2012 | Swinderman et al. ........ 198/499 |
| 2003/0067119 | A1 | | 4/2003 | Burkhard et al. |
| 2005/0109580 | A1 | | 5/2005 | Thompson |
| 2007/0089581 | A1 | | 4/2007 | Sandberg et al. |

FOREIGN PATENT DOCUMENTS

| | | |
|---|---|---|
| EP | 1403187 A1 | 3/2004 |
| JP | H06227650 A | 8/1994 |
| JP | 2000-9522 | 1/2000 |
| JP | 2001-317986 | 11/2001 |
| JP | 2002-221443 A | 8/2002 |
| JP | 2006-095393 A | 4/2006 |
| JP | 2006-258640 A | 9/2006 |
| WO | 2006030171 A1 | 3/2006 |
| WO | 2007050145 A2 | 5/2007 |

OTHER PUBLICATIONS

JPO, Questioning/Cross Examination issued Mar. 21, 2013 in corresponding Japanese Patent Application No. 2010-506797 (6 pages).

PCT, International Search Report issued Aug. 13, 2008, in PCT Application No. PCT/DE2008/000746 (3 pages).

JPO, Appeal Decision of Refusal issued Jan. 8, 2014 in corresponding Japanese Patent Application No. 2010-506797 (17 pages).

JPO, Appeal Decision of Refusal dated Dec. 20, 2013 in corresponding Japanese Patent Application No. 2010-506797 (1 page)(translation).

Directive 2006/42/Ec of the European Parliament and of the Council of May 17, 2006, Official Journal of the European Union, Jun. 9, 2006, pp. 24-86.

Unknown Author, BGI 710 Continuous Conveyors, Mining and Quarrying Professional Association Issue 2004, 2004, front cover, p. 20, and back cover, Germany.

\* cited by examiner

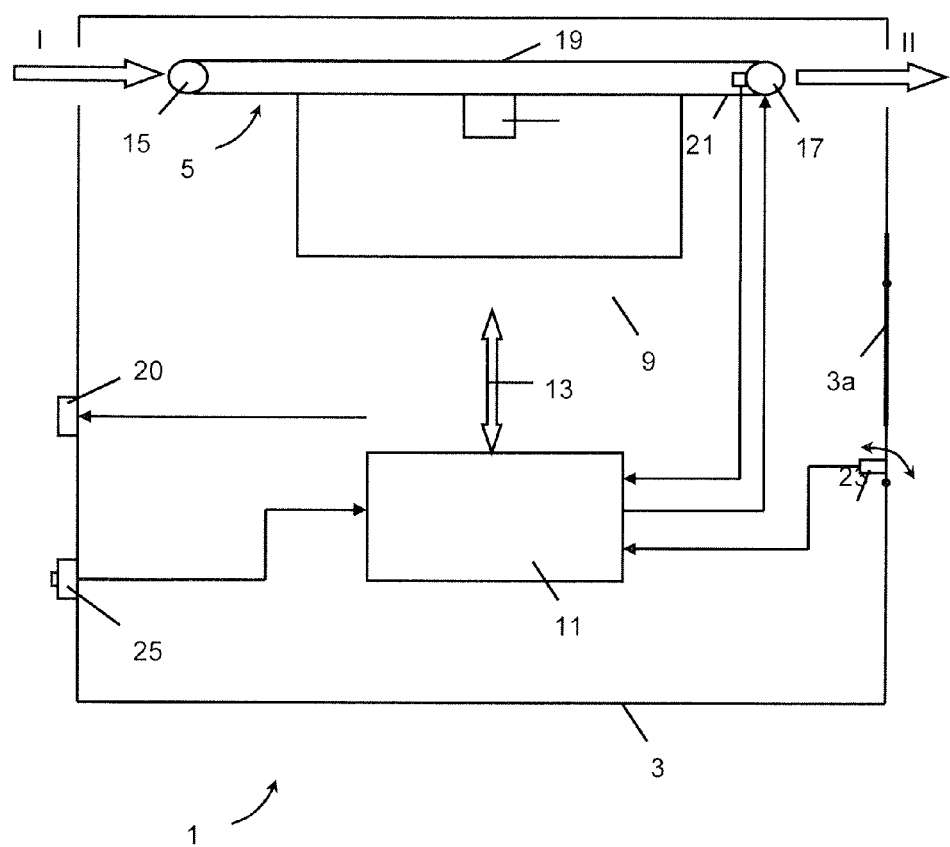

IN-MOTION SCALE, IN PARTICULAR, CONVEYOR SCALE WITH A CONVEYOR BELT

FIELD OF THE INVENTION

The invention relates to in-motion scales, in particular conveyor scales having conveyor belts.

BACKGROUND

In-motion scales, for example, conveyor scales with a conveyor belt, are used in the food industry among other places. Precisely in these cases, the cleaning of the in-motion scales plays a large role, in order to be able to guarantee the required hygiene or purity of the produced products. Here it should be noted that the term "in-motion scale" is used in the course of this description for all scales that have at least one load cell for determining the weight of goods being weighed, as well as arbitrary means for feeding the goods to be weighed to, or leading them away from, the load cell or the point or area of a weighing platform at which the weighing process is performed. In the case of dynamic in-motion scales, frequently a conveyor belt is used that is coupled with the load sensor of the load cell, so that the weight of goods to be weighed on the conveyor belt can also be determined while the belt is moving. A static in-motion scale could be realized, for example, so that goods to be weighed are pushed onto the weighing platform by means of a suitable feeding device, and after a successful (static) weighing process, the goods are removed again from the weighing platform. Thus, the transport means could be realized in various ways, for example, as a (relatively simple) robot arm, slider, or the like. They could be mounted optionally on the weighing platform or on the machine frame.

The cleaning of complex or sensitive production machines, such as, for example, high-quality in-motion scales, requires, as a rule, appropriately trained personnel. Cleaning processes are often time intensive, because the in-motion scale must be opened at positions provided for cleaning and the cleaning of certain areas must be performed.

If in-motion scales, in particular, conveyor scales with at least one load cell and a conveyor belt, are used in the food industry for the production of food in a production line, these are often constructed so that the conveyor scale is largely covered in order to increase measurement accuracy and user safety. Then the conveyor belt can be cleaned, for example, with a steam-jet cleaner. The cleaning process is performed after disconnecting the conveyor scale from power to stop the conveyor belt.

If cleaning of the in-motion scale, as implemented to some extent, is performed during operation, then first there exists the risk that an operating person will be injured by moving elements of the transport means, or the in-motion scale will be damaged, for example, if a steam-jet nozzle collides with a moving element of the transport means.

SUMMARY OF THE INVENTION

The invention provides an in-motion scale, in particular, a conveyor scale with a conveyor belt, which makes possible simple and safe cleaning, also by untrained personnel.

The invention involves an in-motion scale that also has, in addition to one or more weighing operating modes, a cleaning mode in which the functions of the in-motion scale are controlled according to a specified cleaning-mode functional model, so that danger to operating personnel and/or damage to the in-motion scale is prevented or eliminated. The "term cleaning-mode functional model" is translated from the original German term of "Reinigungsmodus-Funktionsmuster," which may be more precisely translated as "cleaning-mode functional pattern." This term may be used interchangeably herein for clarification.

Changing the in-motion scale over to the cleaning mode can be realized by the control device of the in-motion scale itself; for example, such that the control device is automatically switched to the cleaning mode at specified time intervals or at specified time points, or when the control device determines that a series of weighing processes is complete. However, the control device could be set to the cleaning mode on demand, for example, by pressing a switch connected to the control device or contained by the control device, or by feeding an external signal.

The control device is advantageously constructed so that transition to the cleaning mode is possible only in permissible operating states or only from certain permissible operating states. In particular, changing to the cleaning mode can be performed only when the in-motion scale is not supposed to be performing valid weighing processes.

According to one arrangement of the invention, one or more cleaning-mode functional models can be stored in a memory area of a memory of the control device, wherein, in the case of several cleaning-mode functional models, the cleaning-mode functional model specified for the cleaning mode can be selected. The selection of the suitable specified cleaning-mode functional model can be performed by the control device itself or also by feeding a corresponding signal from a higher-level control device.

According to the invention, means for detecting the torque of the drive means of the conveying device are provided, wherein the torque signal of these means is fed to the control device. The specified cleaning-mode functional model can then be selected so that the control device drives the drive means of the conveying device in the cleaning mode so that a specified safety limit for the torque, that is, a maximum permissible torque, is not exceeded. This possibility according to the invention obviously also includes embodiments in which parts of the control device are integrated into a corresponding drive. For example, the drive itself could comprise means for detecting the torque and control means that could switch the drive into various operating modes. In this case, the remaining part of the control device can feed a signal to the part of the control device contained in the drive, which signal contains merely the value for the maximum permissible torque. This value could also be transmitted, for example, as a digital value. The part of the control device contained in the drive can then use this value to operate the drive with a corresponding maximum possible torque. In this way, it can be guaranteed that, through the selection of an appropriately low maximum permissible value for the torque, danger to operating personnel is largely ruled out, and in any case, is dramatically reduced. In the same way, damage to parts of the in-motion scale, for example, the drive, can obviously also be prevented. For example, if the conveyor belt is temporarily blocked by hand for the purpose of cleaning, then in a cleaning mode with this cleaning-mode functional model, the drive motor does not attempt to force movement by a correspondingly high drive current, or in the extreme case by an impermissibly high drive current.

According to one arrangement of the invention, the in-motion scale could also have available a protective device, for example, one or more photoelectric guards, wherein this protective device generates an "intervention" signal and feeds it to the control device when the protective device detects the movement of an operating person into a danger area of the conveying device monitored by the protective device. In the same way, the in-motion scale could also have available an area of a housing or a protective cover that could be opened, wherein means are provided that signal to the conveying device an opening of the relevant area of the housing or an opening of the protective cover. Such protective devices are known in production machines and are typically used to stop the entire production machine or selected moving parts, if the control device detects an "intervention" signal. In the case of the in-motion scale according to the invention, the detection of an "intervention" signal does not, however, mandatorily lead to a stoppage or disconnection of the conveying device. Here, a gauging of path or angle sensors could be eliminated for certain types of drives. The function of the protective device could be deactivated completely or partially or could also be configured differently in the cleaning mode according to the selected cleaning-mode functional model. Here it could be possible, for example, to perform a movement of the conveying device for an active cleaning mode.

According to the invention, the detection of an "intervention" signal can also be used in order to change the currently active cleaning-mode functional models or to select another of several stored cleaning-mode functional models.

According to different arrangements of the invention, one or more specified cleaning-mode functional models could comprise one or more of the following functionalities:

(a) The drive means of the conveying device could be driven with a specified speed. The speed is advantageously selected so that moving elements represent no risk to an operating person, or so that the speed of movement simplifies cleaning, for example, by flinging-off contaminants.

(b) The drive means of the conveying device could be driven with a specified direction of movement. This functionality allows the direction of movement of a conveyor belt or an arbitrary conveying device to be reversed or changed in the cleaning mode relative to the weighing operating mode.

(c) The drive means of the conveying device can be driven with respect to speed and/or direction of movement according to a specified time sequence. This cleaning-mode functional models makes possible, for example, the execution of a certain speed profile for a moving element of a conveying device including a possible reversal of the direction of movement, such as, for example, a forward or backward movement of a conveyor belt or a back and forth movement of a gripper or slider arm.

(d) The drive means of the conveying device can be driven with a specified torque or a specified driving force, wherein the torque or the driving force or the path of movement are selected so that the risk of injury to operating personnel or damage to the in-motion scale is prevented or reduced.

(e) The drive means of the conveying device could be driven so that after cessation of a moment braking a moving element or stopping the movement of a moving element or after cessation of a corresponding force, the movement is automatically re-established according to the specified cleaning functional model. Here it can be prevented that, for example in the case of a manual stopping of a moving element, the entire cleaning process is immediately stopped and must be restarted manually.

(f) The drive means of the conveying device could be driven so that one or more moving elements are moved into a cleaning position. The cleaning position could be selected here to guarantee easy accessibility of the parts to be cleaned.

(g) Furthermore, means for sealing the load cell, in particular, in the area of the load application, could also be activated. This measure could prevent, in particular, the penetration of moisture and/or cleaning agents into sensitive areas of the load cell.

(h) If the in-motion scale has a controllable overload protective device for the load cell, then this could be activated. For example, by blocking the movement of the load sensor of the load cell, destruction of the load cell by impermissibly high load forces (for example, if an operating person impermissibly enters the conveyor belt of a weighing conveyor) can be prevented.

(i) Finally, certain electrical or electronic assemblies, in particular, assemblies for detecting and/or evaluating the weight, could also be disconnected from power. In this way, the destruction of these assemblies by moisture or cleaning agents is prevented. Assemblies that are required for executing the desired functions for an active cleaning mode obviously cannot be disconnected from power; this applies at least for the time periods during which the relevant assemblies must perform their functionality in the cleaning mode.

According to the preferred embodiment of the in-motion scale according to the invention, in the cleaning mode, the control device delivers no valid weight values, for example, for calibration-regulation reasons. This can happen either so that the control device, in general, determines no weight values in the cleaning mode or so that weight values determined during a cleaning process are output marked as invalid.

Additional arrangements of the invention result from the subordinate claims and the detailed description.

BRIEF SUMMARY OF THE DRAWING

The invention will be explained in more detail below with reference to an embodiment shown in the drawing.

The sole FIGURE shows a purely schematic representation of one arrangement of a conveyor scale according to the invention.

DETAILED DESCRIPTION OF PREFERRED EMBODIMENTS

The conveyor scale 1 comprises an essentially closed housing 3 in which all of the essential components of the conveyor scale 1 are provided, in particular, a conveyor belt 5 that applies a load to the load sensor 7 of a load cell 9, and a control device 11.

The load cell 9 is connected to the control device 11 via one or more data lines 13 that could also be constructed as a communications bus.

The conveyor belt 5 has a transport belt 19 guided in a known way around two rollers 15, 17. The roller 17 is driven by means of a drive that is not described in more detail, for example, an electric motor. A torque sensor 21 is arranged on the driven roller 17 or on the drive for this roller, wherein the sensor signal of this sensor is fed to the control device 11. The torque sensor 21 may also be integrated into the drive, for example, an electric motor. The control device 11 controls the (not-shown) drive for the driven roller 17 in the desired way according to the operating mode.

A part of the control device 11 to which the signal of the torque sensor 21 is fed and that executes the actual activation of the drive could also be integrated in the drive. Then merely the desired operating mode for the drive could be reported to this part of the control device 11 from the remaining part of the control device. The connection between these two parts of the control device 11 can then be realized, for example, by means of a communications bus.

The conveyor scale 1 shown in the FIGURE has, in addition, a housing door 3a that can be opened for cleaning purposes for example, in particular, that can be folded outward. The closed position of the housing door or protective cover 3a is detected by means of a position switch 23. The signal of the position switch 23 is likewise fed to the control device 11. In this way, the control unit 11 can detect an opened housing door 3a.

In addition, there is a switch 25 on the outside of the housing 3 the signal of which is fed to the control device 11, or that is connected to the control device 11 so that this can detect the switch position. The switch 25 can obviously be constructed in an arbitrary way, for example, as a pushbutton.

In the normal weighing operating mode, goods to be weighed are fed on the input side to the conveyor scale 1, moved through the housing 3 by means of the conveyor belt 5 of the conveyor scale 1, and discharged again on the output side. The feeding or discharging of the goods to be weighed is symbolized with the arrows I (input side) and II (output side), respectively.

As long as the item to be weighed is located on the transport means 19 of the conveyor belt 5, its weight can be determined (after waiting for transient effects to settle).

If the conveyor scale 1 is to be cleaned, in particular, the conveyor belt 5, then the control device 11 can be put into a cleaning mode by activating the switch 25. Activation of the switch 25 can be made secure by a not-shown safety device, for example, by means of a combination lock, a card reader, or the like.

An active cleaning mode can also be made recognizable by the control device 11 for operating personnel or a higher-level control unit. For this purpose, a display unit 20 controllable by the control device can be activated. The display unit can obviously also be directly dependent on the position of the switch 25 and can indicate an active cleaning mode when the switch 25 is in the relevant switch position. A corresponding signal that signifies an active cleaning mode could be transmitted to a higher-level control unit.

The control device 11 could also automatically change the state over to the cleaning mode, for example, at specified time points or after specified time intervals have elapsed.

In lieu of a switch 25, an external signal (not shown) could also be fed to the control device 11. In this way, the control device 11 could also be set to the cleaning mode, for example, by a higher-level control unit.

In the cleaning mode, the control device 11 could trigger a certain behavior of the conveyor scale 1, in particular, the conveyor belt 5, according to a specified cleaning-mode functional models. The cleaning-mode functional model specified for the cleaning mode could be stored in a memory area of a memory of the control device 11. Obviously, the cleaning-mode functional model could also be realized "hard-wired" in the control device 11.

While the position switch 23 or the signal fed to the control device 11 that signals an "opened" position of the housing door 3a leads in the normal weighing operating mode of the conveyor scale 1 to an immediate stopping of the conveyor scale 1, in particular the conveyor belt 5, such a general shutdown would not be desirable in the cleaning mode.

For example, the cleaning-mode functional model could also be selected so that, in the case of an active cleaning mode, the conveyor belt 5 continues to run at a lower speed than is the case in the weighing operating mode. As an addition or alternative to a lower speed, the maximum torque that the drive of the driven roller 17 generates in the cleaning mode could also be reduced relative to the torque in the weighing operating mode, in order to prevent injuries to an operating person or to drastically reduce the risk of injury.

The cleaning-mode functional model could have various configurations. In addition to reducing the movement speed or also reducing the maximum permissible drive torque, the direction of movement could also be reversed. A specified time sequence of a specified speed profile, including the reversal of the directions of movement, is also possible.

This avoids, for example, the necessity for disassembling the transport means 19 for cleaning purposes. In particular, the advantageously slow forward movement of the transport means 19 can enable cleaning—for example, by means of a steam jet—for each region of the transport means 19. Through different speeds and/or directions of movement, contaminant particles could also be flung away from the transport means 19 or the rollers 15, 17.

In general, the drive means—in the shown embodiment the drive of the roller 17—could be controlled in the case of the active cleaning mode so that the executed movements or the direction and speed (optionally according to a specified time profile) could promote the cleaning effect and could simultaneously prevent, or in any case drastically reduce, a risk of injury to operating personnel or a risk of damage to parts of the in-motion scale or the conveyor scale 1.

The control device 11 could also disconnect unneeded electrical or electronic assemblies or circuits from power according to the cleaning-mode functional model specified for the cleaning mode. Here this could involve, for example, the electronics contained in the load cell 9 or acting with this cell. In this way it is simultaneously achieved that the conveyor scale 1 outputs no weight values in the case of the active cleaning mode, so that there is no risk of invalid weight values will be generated and interpreted incorrectly.

During the cleaning mode, if the generation and supply of weight values is to continue to be enabled, for example, in the case of an appropriately designed cleaning-mode functional model, then the cleaning-mode functional model could provide for the control device 11 to mark those weight values that are generated during the active cleaning mode as invalid weight values.

Another possibility for forming the cleaning-mode functional model consists in activating an overload protective device for the load cell. In the shown embodiment, a device could be provided that supports the conveyor belt 19 on the bottom side in the activated state and thus blocks the application of a loading force on the load sensor 7, or limits the loading force. This prevents the load cell 9 from being damaged by (impermissibly) high loading forces during the cleaning mode.

In addition, a not-shown device could be provided for sealing the load cell, particularly in the region of the load sensor 7, which could be activated in the cleaning mode. This could prevent, for example, the penetration of moisture and/or cleaning agents into the load cell.

Finally, it should be noted that the invention is not limited to the embodiment shown in the sole FIGURE. All in-motion scales that have at least one load cell and a conveying device of any type with which the goods to be weighed are fed to or led away from the load cell are included by the invention. Thus, there could also be included a static scale to whose weighing platform the goods to be weighed are fed by means of a slider or a robot arm. In all of these cases, the behavior during an active cleaning mode is influenced by the provision of a suitable cleaning-mode functional model, so that the cleaning process is promoted and injury to operating personnel and damage to the in-motion scale are prevented.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. An in-motion scale for use in a conveyor system, the in-motion scale comprising:
   (a) a load cell and a conveying device for goods to be weighed, for feeding the goods to and leading them away from the load cell, the conveying device comprising a conveyor belt that applies the goods to a load sensor of the load cell such that the weight of the goods can be determined while the goods are conveyed on the conveyor belt;
   (b) a control device for controlling the functions of the in-motion scale, wherein the control device is constructed to be changed over to a cleaning mode in which the functions of the in-motion scale are controlled according to a specified cleaning-mode functional pattern embodied in the control device or in memory associated therewith, and operative to allow operating personnel to clean the in-motion scale manually, so that danger to operating personnel and damage to the in-motion scale while manually cleaning the in-motion scale is reduced or eliminated;
   (c) wherein the one or more specified cleaning-mode functional patterns comprise additional functionality operable to disconnect specified electrical or electronic assemblies from power; and
   wherein one or more cleaning-mode functional patterns are operable to disconnect the load cell from power.

2. The in-motion scale of claim 1, wherein there are two or more cleaning-mode functional patterns and the cleaning-mode functional pattern specified for the cleaning mode can be selected.

3. The in-motion scale of claim 2, wherein a protective device is provided for the conveying device, wherein this protective device generates an "intervention" signal and feeds it to the control device if the protective device detects the movement of an operating person into a dangerous area of the conveying device monitored by the protective device or the opening of a protective cover for the conveying device, wherein, in a weighing operating mode of the in-motion scale the control device stops the conveying device or influences its function when it detects an "intervention" signal, and wherein in the case of an active cleaning mode the control device does not stop the conveying device when an "intervention" signal is detected.

4. The in-motion scale of claim 3, wherein the control device is adapted to change the specified cleaning-mode functional pattern or selects another of several stored cleaning-mode functional patterns if an "intervention" signal is detected.

5. The in-motion scale of claim 2, wherein the one or more specified cleaning-mode functional patterns comprise the additional functionality that drive means of the conveying device are driven with a specified speed.

6. The in-motion scale of claim 2, wherein the one or more specified cleaning-mode functional patterns comprise the additional functionality that drive means of the conveying device are driven a specified direction of movement.

7. The in-motion scale of claim 2, wherein the one or more specified cleaning-mode functional patterns comprise the additional functionality that drive means of the conveying device are driven with respect to speed or direction of movement according to a specified time sequence providing a specified speed profile for a moving element of the conveying device including a reversal of the direction of movement.

8. The in-motion scale of claim 2, wherein the one or more specified cleaning-mode functional patterns comprise the additional functionality that drive means of the conveying device are driven with a specified torque or a specified driving force or a specified path of movement, wherein the torque or driving force or path of movement is selected so that danger to operating personnel or damage to the in-motion scale is prevented.

9. The in-motion scale of claim 2, wherein the one or more specified cleaning-mode functional patterns comprise the additional functionality that drive means of the conveying device are driven so that, after cessation of a moment braking or stopping the movement, or after cessation of a corresponding force, the movement is automatically re-established according to the specified functional pattern.

10. The in-motion scale of claim 2, wherein the one or more specified cleaning-mode functional patterns comprise the additional functionality that drive means of the conveying device are driven so that one or more moving elements are moved into a cleaning position.

11. The in-motion scale of claim 2, wherein the one or more specified cleaning-mode functional patterns comprise the additional functionality that means for sealing the load cell in the area of the load application, are activated.

12. The in-motion scale of claim 2, wherein the one or more specified cleaning-mode functional patterns comprise the additional functionality of activation of an overload protective device for the load cell.

13. The in-motion scale of claim 2, wherein the control device is adapted to activate a specified cleaning mode after a specified time or after a specified number of weighing processes.

14. An in-motion scale for use in a conveyor system, the in-motion scale comprising:
   (a) a load cell and a conveying device for goods to be weighed, for feeding the goods to and leading them away from the load cell, the conveying device comprising a conveyor belt that applies the goods to a load sensor of the load cell such that the weight of the goods can be determined while the goods are conveyed on the conveyor belt;
   (b) a control device for controlling the functions of the in-motion scale, wherein the control device is constructed to be changed over to a cleaning mode in which the functions of the in-motion scale are controlled according to a specified cleaning-mode functional pattern embodied in the control device or in memory associated therewith, and operative to allow operating personnel to clean the in-motion scale manually, so that danger to operating personnel and damage to the in-motion scale while manually cleaning the in-motion scale is reduced or eliminated;
   (c) wherein the one or more specified cleaning-mode functional patterns comprise additional functionality operable to disconnect specified electrical or electronic assemblies from power; and
   wherein the control device is adapted to activate the cleaning mode after a specified time or after a specified number of weighing processes.

15. An in-motion scale for use in a conveyor system, the in-motion scale comprising:
(a) a load cell and a conveying device for goods to be weighed, for feeding the goods to and leading them away from the load cell, the conveying device comprising a conveyor belt, driven by drive means, that applies the goods to a load sensor of the load cell such that the weight of the goods can be determined while the goods are conveyed on the conveyor belt;
(b) a control device for controlling the functions of the in-motion scale, wherein the control device is constructed to be changed over to a cleaning mode in which the functions of the in-motion scale are controlled according to a specified cleaning-mode functional pattern embodied in the control device or in memory associated therewith and operative to allow operating personnel to clean the in-motion scale manually, so that danger to operating personnel and damage to the in-motion scale while manually cleaning the in-motion scale is reduced or eliminated; and
(c) a torque sensor connected to the conveying device drive means and communicatively connected to the control device, wherein the control device, according to the specified cleaning-mode functional pattern, is operable to determine a torque of the drive means and to drive the drive means in the cleaning mode such that a specified safety limit for the torque is not exceeded.

16. The in-motion scale of claim 15, wherein the one or more specified cleaning-mode functional patterns comprise the additional functionality that specified electrical or electronic assemblies for determining or evaluating the weight, are disconnected from power.

* * * * *